(12) United States Patent
Maldener et al.

(10) Patent No.: US 7,649,293 B2
(45) Date of Patent: Jan. 19, 2010

(54) ROTOR OF AN ELECTRICAL MACHINE

(75) Inventors: Klaus Maldener, Lauf (DE); Andreas Wehrle, Durbach (DE); Gerd Walter, Rohrwiller (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/591,844

(22) PCT Filed: Mar. 17, 2005

(86) PCT No.: PCT/EP2005/051253

§ 371 (c)(1),
(2), (4) Date: Sep. 5, 2006

(87) PCT Pub. No.: WO2005/099065

PCT Pub. Date: Oct. 20, 2005

(65) Prior Publication Data

US 2007/0138889 A1    Jun. 21, 2007

(30) Foreign Application Priority Data

Apr. 10, 2004  (DE) ................ 10 2004 017 716

(51) Int. Cl.
*H02K 21/12* (2006.01)
(52) U.S. Cl. .................. 310/156.22; 310/156.16; 310/156.38
(58) Field of Classification Search ............ 310/156.22, 310/156.16
See application file for complete search history.

(56) References Cited

U.S. PATENT DOCUMENTS

| | | | | |
|---|---|---|---|---|
| 5,481,148 A | * | 1/1996 | Moribayashi et al. | 310/154.16 |
| 5,574,323 A | * | 11/1996 | Nusser | 310/156.22 |
| 5,576,588 A | * | 11/1996 | Moribayashi et al. | 310/154.16 |
| 5,578,884 A | * | 11/1996 | Moribayashi et al. | 310/154.16 |
| 5,936,324 A | * | 8/1999 | Montagu | 310/156.11 |
| 5,942,829 A | * | 8/1999 | Huynh | 310/178 |
| 2002/0130577 A1 | * | 9/2002 | Suzuki et al. | 310/156.82 |
| 2004/0046469 A1 | * | 3/2004 | Oshima et al. | 310/156.21 |
| 2004/0051415 A1 | * | 3/2004 | Hamamura et al. | 310/156.28 |
| 2006/0158053 A1 | * | 7/2006 | Aschoff et al. | 310/91 |

FOREIGN PATENT DOCUMENTS

| | | | |
|---|---|---|---|
| DE | 100 53 245 | | 5/2002 |
| DE | 102 05 413 | | 8/2003 |
| DE | 103 14 394 | | 10/2004 |
| EP | 0 872 945 | | 10/1998 |
| FR | 2 723 490 | | 2/1996 |
| GB | 1 009 827 | | 11/1965 |
| JP | 60170433 | | 9/1985 |
| JP | 63069450 | | 3/1988 |
| JP | 04165933 A | * | 6/1992 |
| JP | 5056582 | | 3/1993 |
| WO | 02/35681 | | 5/2002 |
| WO | WO 3067742 A1 | * | 8/2003 |

* cited by examiner

*Primary Examiner*—Quyen Leung
*Assistant Examiner*—Alex W Mok
(74) *Attorney, Agent, or Firm*—Michael J. Striker

(57) ABSTRACT

The rotor (1) of an electrical machine (10), having at least one permanent magnet (3), which is embodied as a hollow cylinder (5) and which has axial contact faces (20) that cooperate with corresponding axial clamping faces (22) of at least one retaining element (4), with which element the permanent magnet (3) is secured to the rotor (1), in which at least one of the clamping faces (22) has a knurling (46) extending in the radial direction.

26 Claims, 4 Drawing Sheets

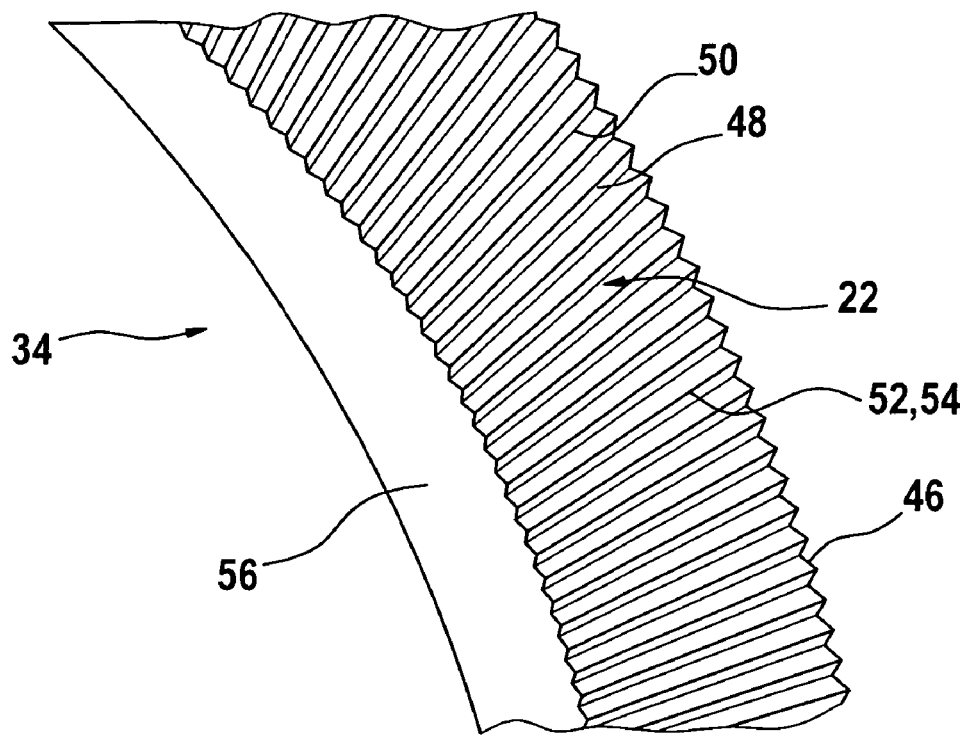
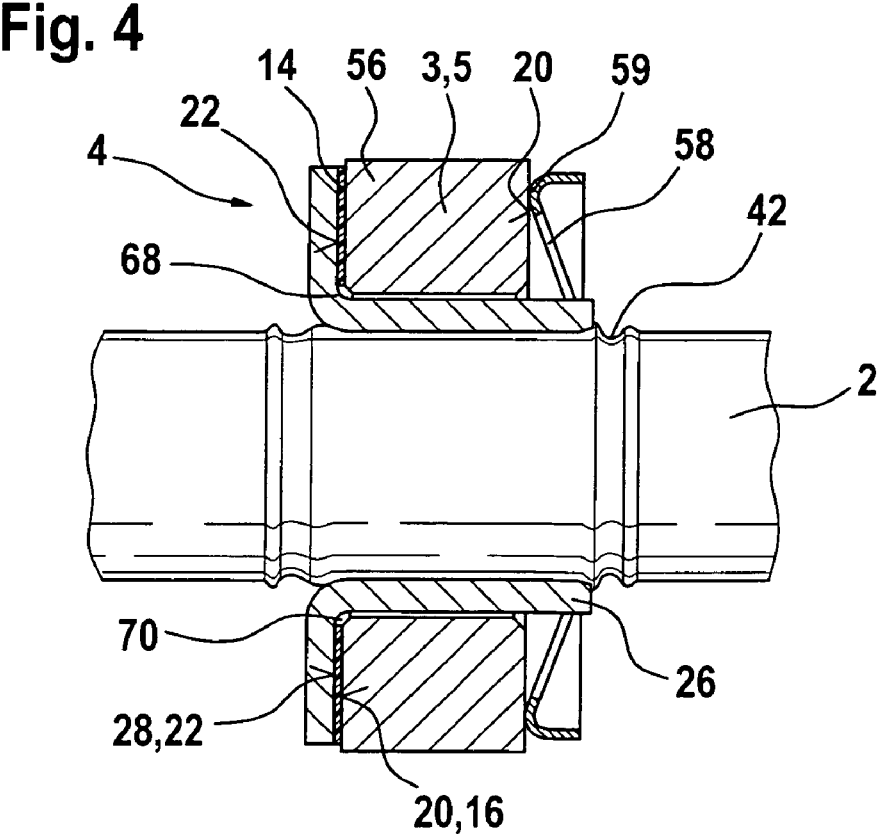

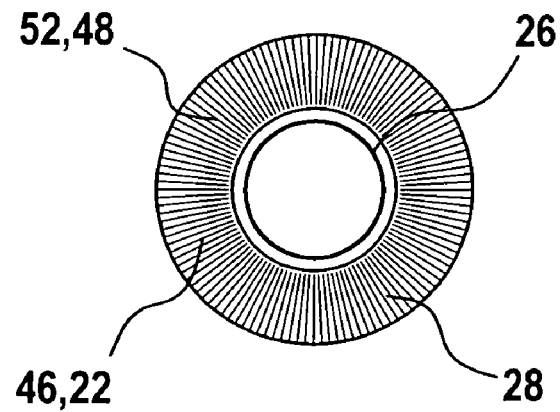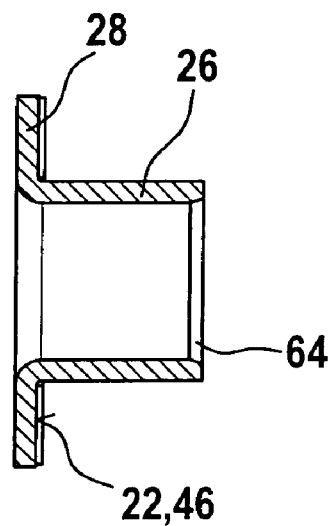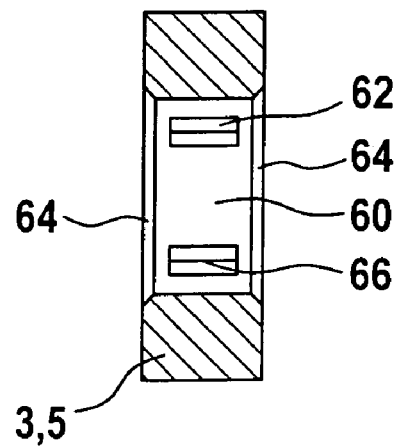

ROTOR OF AN ELECTRICAL MACHINE

CROSS-REFERENCE TO A RELATED APPLICATION

The invention described and claimed hereinbelow is also described in German Patent Application DE 10 2004 017716.3 filed on Apr. 10, 2004. This German Patent Application, subject matter of which is incorporated herein by reference, provides the basis for a claim of priority of invention under 35 U.S.C. 119 (a)-(d).

BACKGROUND OF THE INVENTION

Electrical machines are well known in the prior art. For instance, direct current motors excited permanent-magnetically are known, which can be commutated electronically or mechanically. Two types can be distinguished, namely one in which the permanent magnets are located on the stator, and another in which the permanent magnets are mounted on the rotor. The commutated magnetic field between the permanent magnet and the coils located on the other component bring about the torque on the rotor shaft.

For securing the permanent ring magnet on a rotor body of the rotor shaft, it is known for instance from European Patent Disclosure EP 0 872 945 A1 to use an adhesive bond. Because of different temperature expansions of the different materials comprising the magnet, adhesive and rotor body, and because of manufacturing variations, and because of the spacing between the magnet and the rotor shaft/rotor body required when an adhesive is used, major material stresses on the individual materials (magnet, adhesive, shaft) occur at the joining faces. In operation of the electrical machine, major temperature differences can additionally occur, which because of the different coefficients of expansion of the materials lead to cracks and even to the point of material breakage, so that transmission of a torque from the magnet to the rotor shaft is no longer possible. The mechanical properties of the adhesive furthermore become poorer as the temperature increases, and as a consequence the magnet is no longer fixed to the rotor shaft solidly enough.

SUMMARY OF THE INVENTION

In keeping with these objects, one feature of the present invention resides, briefly stated, in a rotor (1) of an electrical machine (10), having at least one permanent magnet (3), which is embodied as a hollow cylinder (5) and which has axial contact faces (20) that cooperate with corresponding axial clamping faces (22) of at least one retaining element (4), with which element the permanent magnet (3) is secured to the rotor (1), wherein at least one of the clamping faces (22) has a knurling (46) extending in the radial direction, and wherein the retaining element (4) has a spring element (30, 32) which presses the clamping face (22) against the contact face (20) with a contact pressure.

When a rotor of an electrical machine is designed in accordance with the present invention, it has the advantage that because of its axially prestressed securing, the pressure-sensitive permanent magnet, even if major temperature fluctuations occur, remains cleanly centered relative to the rotor shaft without being destroyed. Because of the integral forming of a radial knurling on the clamping faces of the retaining elements, the contact face of the permanent magnet can on the hand more relative to the clamping face in order to compensate for material stresses, while on the other, even if such relative motion occurs, the permanent magnet remains exactly centered relative to the rotor shaft by the guiding function of the radial grooves. As a result, pairings of materials for the contact face and the clamping face that have different coefficients of thermal expansion can be used, and self-centering of the magnet is assured by the radial location of the fluting.

If the radial knurling has raised areas which extend in the radial direction and which in the axial direction are tapered to a point in wedgelike fashion, the raised areas, under the influence of the axial clamping force, can easily dig into the contact faces of the magnet, or of its surface coating, and as a result can form a form lock with regard to the tangential direction (direction of rotation).

If the retaining element is embodied in multiple parts and has a separate ring element on whose axial end face the clamping face with the radial knurling is integrally formed, then this ring element with the radially extending raised areas can be made from a special material that is adapted to the material comprising the permanent magnet. The supporting of the magnet can easily be adapted to various applications, for instance with or without a rotor base body, by means of the shaping of the ring.

For the axially elastic support of the permanent magnet, it is advantageous if a spring element, which generates the axial contact pressure between the contact face and the clamping face, is located on the retaining element.

The spring element is preferably embodied as a cup spring, which is braced radially on a sleeve and axially on a shoulder of the retaining element and which in particular constantly presses the separate ring element against the magnet.

By the engagement of the radially extending raised areas with the inside of the contact face of the magnet, the magnet is guided radially if there is an expansion of material and at the same time is thus centered radially. Because of the form lock between the clamping face and the contact face, quite a high torque can be transmitted despite the axially elastic support.

For use of the permanent magnet as a working magnet, this magnet is made of relatively soft and brittle magnetic material, which can be easily formed as a hollow cylinder by means of sintering. For use as a sensor magnet, the magnet is preferably plastic-bonded, and in both versions, such magnetic materials as iron or rare earth elements, in particular neodymium compounds, are employed.

It is especially favorable to coat the permanent magnet on its surface; in particular, a plastically formable material such as epoxy resin, nickel or aluminum is employed. As a result, not only is the magnet protected against corrosion but at the same time it has a relatively soft axial contact face that the clamping face can dig into.

To that end, the clamping face—particularly at the ring element—is made for instance from a very hard material, such as steel or an Invar alloy, and as a result, because of the axial contact pressure, the raised areas can dig both into a soft coating and directly into the sintered material or into the plastic-bonded magnet. The material comprising the raised areas can additionally be selected such that its coefficient of thermal expansion is quite low, and in particular is approximately the same as that of the permanent magnet.

In a further feature of the invention, a rotor body is located between the hollow cylinder of the permanent magnet and the armature shaft and serves for instance as a magnetic short circuit for the permanent magnet and as a result increases its magnetic field intensity. The ring element with the clamping face is simple to adapt this geometry and can be located on the circumference of the short-circuit body.

The centering of the permanent magnet is implemented in operation of the rotor exclusively by way of the radial guidance of the clamping face with the contact face. For precentering the permanent magnet, upon installation of the armature, however, it is advantageous if the permanent magnet rests on a radial collar of the retaining element, and in particular of the ring element or of the rotor body. In a further embodiment, an additional radial elastic bearing can be supported by a spring element acting in the radial direction, and the permanent magnet rests with an inside face on this spring element.

Because of the elastic axial support of the pressure-sensitive magnet via the contact faces and the clamping faces, economical and standardized securing methods, such as material deformation, welding, press-fitting, adhesive bonding, or clamping rings, can be employed for fixing the retaining elements on the armature shaft in a way that is fixed against both relative rotation and displacement.

It is especially favorable if the retaining element has a sleevelike extension, with which the retaining element is supported on the armature shaft on the one hand and on the other serves to receive the permanent magnet or the rotor body. An axial shoulder formed integrally on the retaining element simultaneously serves the purpose of direct or indirect axial bracing of the contact face of the permanent magnet.

To that end, on the axial shoulder of the retaining element, the clamping face with the radially oriented raised areas is preferably formed integrally on the retaining element, so that the contact face of the magnet rests directly on the axial shoulder of the retaining element. Particularly for using the permanent magnet as a sensor magnet, it is advantageous to form radial crumple elements on its radial inside face, which serve the purpose of precentering on the sleeve of the retaining element.

If the retaining element and in particular its sleevelike extension is made from a magnetically conductive material, then it can simultaneously act as a magnetic short circuit body for the permanent magnet.

For permanent magnets with a relatively short axial length, for instance of less than 10 mm, the permanent magnet can be secured by means of a single retaining element. The permanent magnet is supported on the sleeve of the retaining element by means of a resilient clamping or blocking element that is braced axially on the sleeve and presses the permanent magnet against the radially knurled clamping face on the other end of the sleeve.

The rotor of the invention is preferably used in an electrical machine, and the permanent magnet is employed either as a working magnet of the rotor or as a sensor magnet for detecting a rotational position. Because of the support via the radially knurled clamping face, securing the pressure-sensitive permanent magnet in a way that is not only fixed against relative rotation and against displacement but is also precise in terms of position and concentricity, is assured even if major temperature fluctuations occur.

BRIEF DESCRIPTION OF THE DRAWINGS

Various exemplary embodiments of a device of the invention are shown in the drawings and described in further detail in the ensuing description.

FIG. 3 shows a detail of a radially knurled clamping face;

FIG. 4 shows an enlarged detail of the sensor magnet of FIG. 3;

FIGS. 5 and 6 show a view and a section, respectively, of a retaining element of FIG. 4; and FIG. 7 shows a section through a permanent magnet of FIG. 4.

DESCRIPTION OF THE PREFERRED EMBODIMENTS

Figure 1:
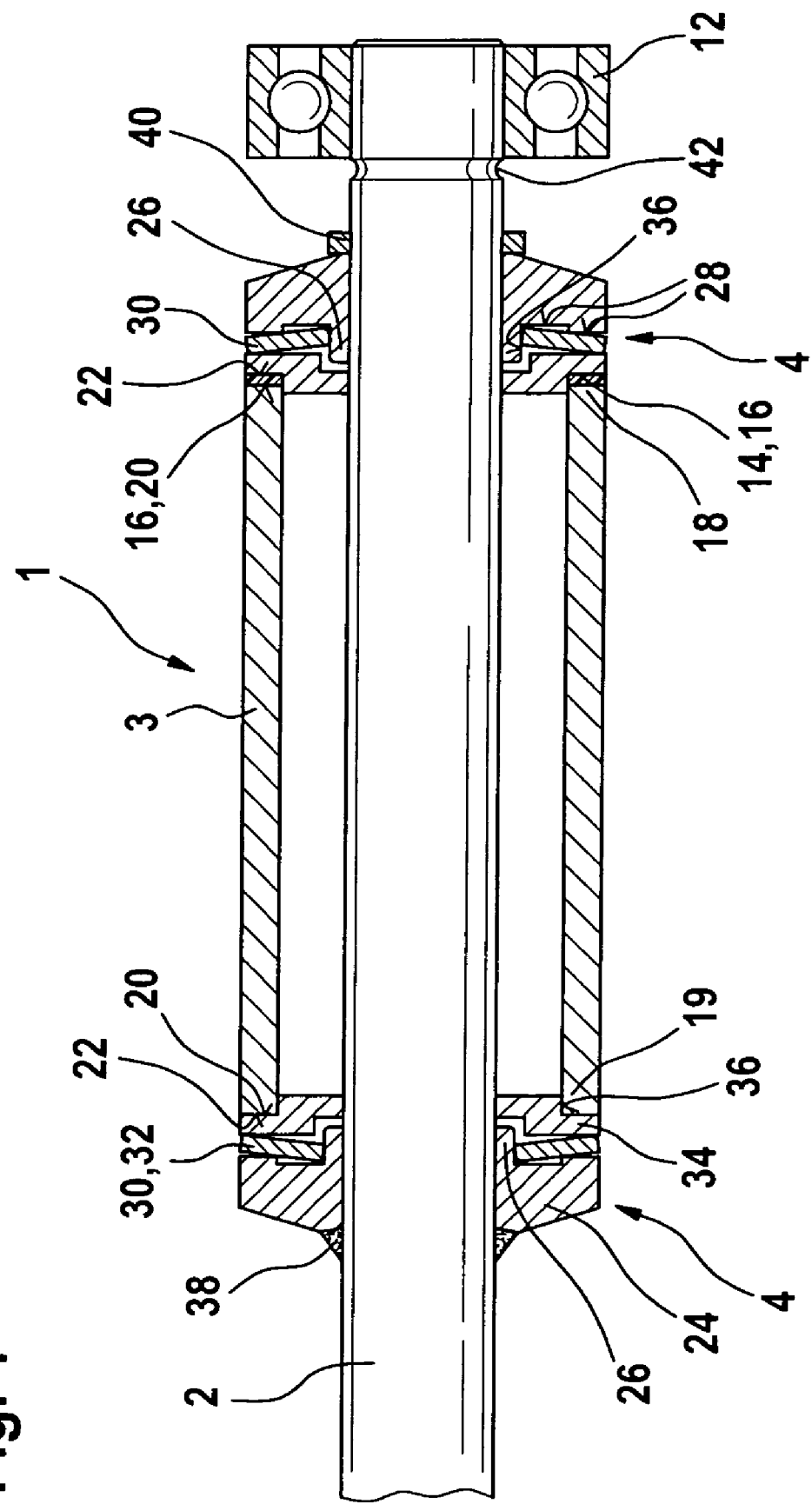
FIG. 1 shows a section through a rotor according to the invention.

Below, with reference to FIG. 1, an armature 1 will be described in a first exemplary embodiment of the invention. In FIG. 1, a rotor 1 is shown, which is supported by means of slide or ball bearings 12 in a housing 11, not shown in further detail, of an electrical machine 10. The rotor 1 includes both a rotor shaft 2 and a permanent magnet 3 that is secured on the rotor shaft 2 by means of two retaining elements 4. The permanent magnet 3 is made from iron or a neodymium-containing sintered material 56 and is embodied approximately as a hollow cylinder 5. The permanent magnet 3 has a coating 14 of a plastically deformable material, such as epoxy resin or a soft metal that on the one hand protects the permanent magnet 3 against corrosion and on the other forms a deformable surface 16. On each of its two axial ends 18, 19, the permanent magnet 3 has a respective approximately annular contact face 20, and these contact faces each rest on corresponding clamping faces 22 of the retaining elements 4. The retaining elements 4 in this example are embodied in multiple parts. They have a base body 24, which is supported on the rotor shaft 2 by means of an axial sleevelike part 26. The retaining element 4 also has an axial collar 28, on which a spring element 30, as a further component of the retaining element 4, is braced at least axially. In the exemplary embodiment, the spring element 30 is embodied as cup spring 32, which is additionally braced radially on the sleeve 26 of the retaining element 4. The spring element 30 presses a further annular component 34 of the retaining element 4 against the contact face 20 of the permanent magnet 3. In the exemplary embodiment, the ring element 34 has a radial collar 36 of the retaining element 4, on which the permanent magnet 3 is braced radially by precentering upon assembly of the rotor 1.

For assembling the permanent magnet 3, a retaining element 4, for instance, on the base body 24 is solidly fixed to the rotor shaft 2 by means of a weld seam 38 or a securing ring 40. The spring element 30 and the ring element 34 with the clamping face 22 are mounted axially, for instance as a pre-assembled group, on the base body 24. Next, the permanent magnet 3 and the second retaining element 4 with its individual components are thrust in reverse order onto the rotor shaft 2. Before the second retaining element 4 is secured to the armature shaft 2, the two retaining elements 4 are pressed together, by a predefined prestressing force counter to the spring forces of the spring elements 30, in such a way that the permanent magnet 3 is held solely by the axial contact pressure between the contact faces 20 and the clamping faces 22. Alternatively, securing the retaining elements 4 and the bearings 12 can be done by means of material deformation at the rotor shaft 2 or at the retaining elements, as is implemented for instance by means of roller-burnished grooves 42, as shown in FIG. 3. For minimizing tolerances, a plurality of components can advantageously be solidly roller-burnished in a single operation using roller-burnishing disks.

Figure 2:
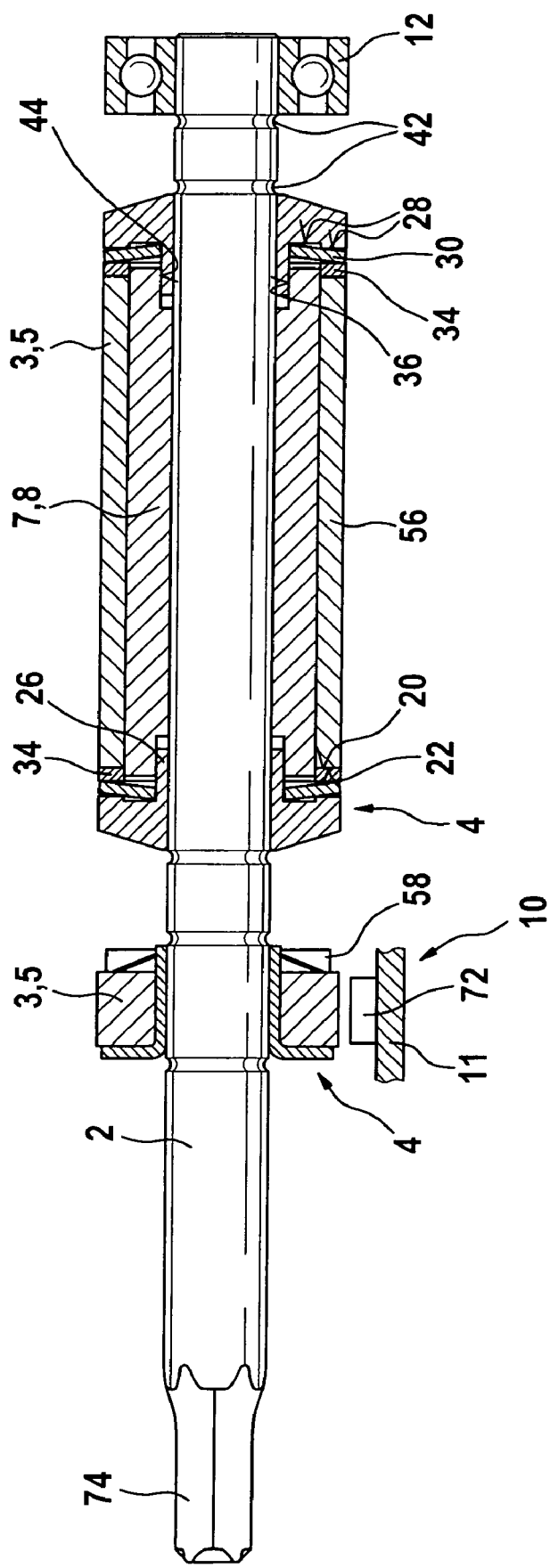
FIG. 2 shows a section of a further exemplary embodiment of a rotor.

FIG. 2 shows a further exemplary embodiment of a rotor 1 of the invention; here, a magnetic short circuit element 7 is located as a rotor body 8 between the permanent magnet 3 and the rotor shaft 2. The short-circuit element 7, in the case of a radially magnetized permanent magnet 3, leads to an amplification of the magnetic field intensity between the rotor shaft 2 and the hollow cylinder 5 of the permanent magnet 3. In a permanent magnet 3 of FIG. 1 magnetized in some other way, the field lines extend inside the hollow cylinder 5, so that no magnetic short circuit element 7 is disposed there. The magnetic short-circuit element 7 of FIG. 2 rests with a recess 44 against the two radial collars 36 of the retaining elements 4 and at the same time serves as a rotor body 8, on which the hollow cylinder rests radially for precentering in the assembly operation. The ring element 34 of the retaining element 4 is likewise located on the rotor body 8 and surrounds both the rotor body and the armature shaft 2 completely. Once again, the permanent magnet 3 is axially elastically supported via its contact faces 20 and the diametrically opposed clamping faces 22 of the ring elements 34. The clamping face 22 of the retaining element 4, which face is integrally formed here onto the separate ring element 34, has an axial knurling 46, as is shown in FIG. 3 in an enlarged detail of the ring element 34 of FIG. 2.

The knurling 46 in FIG. 3 has raised areas 48, which alternate with grooves 50 and extend in the radial direction. The raised areas 48 have a sharp edge 52, which in the installed state dig into the diametrically opposed contact face 20 of the permanent magnet 3. The sharp edges 52 have a wedge-shaped point 54, so that the raised area 48 penetrates the softer contact face 20 more easily. To that end, the ring element 34 with the raised areas 48 is made from a high-strength material, such as steel or an Invar alloy. The material 56 is selected for instance such that its coefficient of thermal expansion is approximately the same as that of the permanent magnet 3. However, even if the thermal expansion of the clamping face 22 and the contact face 20 differs, the permanent magnet 3 is guided along the radial raised areas 48 in the event of a relative motion, so that the permanent magnet 3 remains exactly centered relative to the rotor shaft 2.

In FIG. 2, as a further embodiment of a permanent magnet 3, a sensor magnet 3 is shown which is secured to the rotor shaft 2 by means of a single retaining element 4. This exemplary embodiment is shown enlarged in FIG. 4, in which the retaining element has a sleeve 26, which is secured to the rotor shaft 2 for instance by means of material deformation. The retaining element 4 furthermore has an axial shoulder 28, onto which the clamping face 22 having the radial knurling 46 is formed directly integrally with the sleeve 26. The permanent magnet 3 here rests directly with its contact face 20 on the radial knurling 46 with an axial prestressing which is exerted by a spring element 30 embodied as a blocking element 58. The blocking element or speed nut 58 is braced axially directly on the sleeve 26 of the one retaining element 4, and with its elastic region 59 it rests on the second contact face 20 of the permanent magnet 3. The permanent magnet 3 can be completely preinstalled on the retaining element 4 even before the retaining element 4 is installed on the rotor shaft 2.

To that end, the hollow cylinder 5, which in this embodiment is embodied as a plastic-bonded magnet 5, has crumple elements 62 on its radial inside face 60, by means of which elements the permanent magnet 3 is easily pressed onto the sleeve 26 of the retaining element 4 shown in FIG. 6. For easier assembly, the hollow cylinder 5 has chamfers 64 on its inside face 60. The crumple elements 62 are embodied integrally with the permanent magnet 3 and have a radial taper, for instance a radial pointed tip 66. If these crumple elements 62 are irreversibly deformed upon the preassembly or in the temperature drift, then the radial centering of the permanent magnet 3 on the axial shoulder 28 of the retaining element 4 is assured by the radially extending raised areas 48. The sharp edges 52 dig directly into the surface 16 of the relatively soft plastic-bonded magnet 3, as a result of which a contrary guidance to the radial extent of the hollow cylinder 5 is created. So that the clamping face 22 can rest tightly against the contact face 20, material is recessed out of the inside face 60 of the hollow cylinder 5 by the chamfer 64, so that a free space 70 for a bending radius 68 is created between the sleeve 26 and the axial shoulder 28.

The rotor 1 is a component of an electrical machine 10, such as an adjusting motor for moving parts in the motor vehicle. Hence a power takeoff pinion 74, for instance, as a power takeoff element 74, is integrally formed onto the rotor shaft 2 in FIG. 2 and engages a corresponding set of teeth, not further shown, of an adjustment simulator. For generating a revolving outer magnetic field which causes the rotor 1 to rotate, electromagnets are located in a stator of the electrical machine 10 and are triggered via an electrical commutation. For detecting the position of the adjusting drive, Hall sensors 72 are located on the circumference of the sensor magnet 3 and detect the magnetized change of polarity of the hollow cylinder 5.

It should be noted that with regard to the exemplary embodiments shown in the drawings and described here, manifold possible combinations of the various characteristics with one another are possible. For instance, the specific embodiment of the retaining elements 4 and how they are secured on the rotor shaft 2 may be varied. In an alternative embodiment, the two retaining elements 4 may be integrated into a single common rotor body 8, on which the permanent magnet 3 is axially elastically supported. Depending on the intended use, the shape of the hollow cylinder 5 and in particular its axial length can be embodied quite variously, and how the retaining elements are embodied can be adapted accordingly. The materials 56 used for the permanent magnets 3, coating 14 and clamping faces 22 or ring elements 34 can likewise be adapted to the corresponding demands made of them. The invention is especially suitable for use in adjusting drives for automatic transmissions in the motor vehicle.

The invention claimed is:

1. A rotor (1) of an electrical machine (10), having at least one permanent magnet (3), which is embodied as a hollow cylinder (5) and which has axial smooth contact faces (20) that cooperate with corresponding axial clamping faces (22) of at least one retaining element (4), with which element the permanent magnet (3) is secured to the rotor (1), wherein at least one of the clamping faces (22) has a knurling (46) extending in the radial direction, wherein the retaining element (4) has a spring element (30, 32) which presses the clamping face (22) against the contact face (20) with a contact pressure, and wherein the radial knurling (46) is configured so that under an action of an axial clamping force it digs into an element selected from the group consisting of the smooth contact faces (20) of the magnet, and a smooth surface coating of the magnet, wherein the knurling (46) has radial grooves (50) and axially pointed raised areas (48, 52) which extend in the radial direction, wherein the axially pointed raised areas (48, 52) have sharp edges (52) with wedge-shaped points (54) and are composed of a high-strength material, penetrating more easily into the smooth contact faces (20) that are softer.

2. The rotor (1) as defined by claim 1, wherein the retaining element (4) has a ring element (34), on whose axial side (28)—facing toward at least the contact face (20)—the clamping face (22) is integrally formed.

3. The rotor (1) as defined by claim 1, wherein the spring element (30) is braced axially and radially on the retaining element (4) and elastically supported the permanent magnet (3).

4. The rotor as defined by claim 3, wherein the spring element (30) is configured as a cup spring (32).

5. The rotor (1) as defined by claim 1, wherein the radial raised areas (48, 52) engage the inside of the contact face (20) of the permanent magnet (3), in order to transmit a torque between the permanent magnet (3) and the retaining element (4) and/or to center the permanent magnet (3) radially to the rotor (1).

6. The rotor (1) as defined by claim 1, wherein the permanent magnet (3) is manufactured of sintered material or plastic-bonded material.

7. The rotor as defined by claim 6, wherein the permanent magnet (3) contains elements selected from the group consisting of ferrite elements, rare earth elements, and both.

8. The rotor as defined by claim 6, wherein the permanent magnet (3) is composed of NdFeB.

9. The rotor (1) as defined by claim 1, wherein the permanent magnet (3), at least on one of its stop faces (20), has a coating (14) which is softer than the material (56) of the raised areas (48, 52).

10. The rotor as defined by claim 9, wherein said coating is composed of a material selected from the group consisting of epoxy resin, nickel and aluminum.

11. The rotor (1) as defined by claim 1, characterized in that the raised areas (48, 52) are manufactured of harder material (56) than the permanent magnet (3) or the coating (14) and has a coefficient of thermal expansion that is adapted to the permanent magnet (3) used.

12. The rotor as defined by claim 11, wherein the raised area (48, 52) are composed of a material selected from the group consisting of steel and Invar.

13. The rotor (1) as defined by claim 1, wherein the rotor (1) has a rotor shaft (2) and/or a rotor body (8), embodied as a magnetic short circuit (7), which are surrounded by a ring element (34) that has the clamping face (22).

14. The rotor (1) as defined by claim 1, wherein the retaining element (4) has a radial collar (36) or a radial-elastic element, on which the permanent magnet (3) is braced for radial precentering.

15. The rotor as defined by claim 14, wherein the retaining element (4) has a ring element (34) having the radially collar (36) or a radial-elastic element, on which the permanent magnet (3) is braced for radially precentering.

16. The rotor (1) as defined by claim 1, wherein the retaining element (4) is solidly fixed on the rotor shaft (2) by means of securing rings (40), spring components, laser welding, adhesive bonding, material deformation, or shrink-fitting.

17. The rotor (1) as defined by claim 1, wherein the retaining element (4) is embodied as a sleeve (26) with an axial shoulder (28) on which the contact face (20) is braced.

18. The rotor (1) as defined by claim 1, wherein the axial shoulder (28) is embodied as the clamping face (22).

19. The rotor (1) as defined claim 1, wherein the permanent magnet (3), on its inside face (60), has extensions (62) with which the permanent magnet (3) is pressed against the sleeve (26) for precentering.

20. The rotor (1) as defined by claim 1, wherein the retaining element (4) is embodied as a magnetic short circuit (7).

21. The rotor (1) as defined claim 1, wherein the spring element (30) is embodied as a speed nut (58), which is braced directly on the sleeve (26).

22. The rotor as defined by claim 21, wherein the spring element (30) embodied as the spring nut (58) braced directly on the sleeve (26) rests directly on one of the contact faces (20).

23. An electrical machine (10) having a rotor (1) as defined by claim 1, wherein the permanent magnet (3) cooperates with at least one Hall sensor (72) or one electrically commutated magnetic field revolving around the rotor (1).

24. The rotor as defined in claim 1, wherein the radial knurling (46) has raised areas which alternate with grooves and extend in a radial direction.

25. The rotor as defined in claim 24, wherein the raised areas are composed of high-strength material.

26. The rotor as defined in claim 1, wherein the axially pointed raised areas (48, 52) dig in the contact faces (20) of the magnet or the surface coating of the magnets so as to form a form lock with regard to a tangential direction.

* * * * *